(12) United States Patent
Yamaguchi et al.

(10) Patent No.: US 12,509,616 B2
(45) Date of Patent: Dec. 30, 2025

(54) ADHESIVE SHEET, SEMICONDUCTOR MODULE, AND METHOD FOR PRODUCING ADHESIVE SHEET

(71) Applicant: Nitto Shinko Corporation, Sakai (JP)

(72) Inventors: Takeshi Yamaguchi, Sakai (JP); Maki Nakao, Sakai (JP)

(73) Assignee: NITTO SHINKO CORPORATION, Fukui (JP)

( * ) Notice: Subject to any disclaimer, the term of this patent is extended or adjusted under 35 U.S.C. 154(b) by 401 days.

(21) Appl. No.: 18/022,835

(22) PCT Filed: Jul. 2, 2021

(86) PCT No.: PCT/JP2021/025063
§ 371 (c)(1),
(2) Date: Feb. 23, 2023

(87) PCT Pub. No.: WO2022/044543
PCT Pub. Date: Mar. 3, 2022

(65) Prior Publication Data
US 2023/0313003 A1    Oct. 5, 2023

(30) Foreign Application Priority Data
Aug. 25, 2020    (JP) ................... 2020-141744

(51) Int. Cl.
*C09J 163/04*    (2006.01)
*C09J 7/28*    (2018.01)
*C09J 11/04*    (2006.01)

(52) U.S. Cl.
CPC ............. *C09J 163/04* (2013.01); *C09J 7/28* (2018.01); *C09J 11/04* (2013.01);
(Continued)

(58) Field of Classification Search
CPC . C09J 163/04; C09J 7/28; C09J 711/04; C09J 2301/50; C09J 2301/124
(Continued)

(56) References Cited

U.S. PATENT DOCUMENTS 5,674,611 A    10/1997    Saida et al.
2007/0154670 A1*    7/2007    Hannington ........ B29C 63/0047
428/40.1

(Continued)

FOREIGN PATENT DOCUMENTS

CN    102124066 A    7/2011
CN    111372771 A    7/2020
(Continued)

OTHER PUBLICATIONS

Notification of Transmittal of Translation of the International Preliminary Report on Patentability (Form PCT/IB/338) issued in counterpart International Application No. PCT/JP2021/025063 mailed Mar. 9, 2023 with Forms PCT/IB/373 and PCT/ISA/237. (12 pages).
(Continued)

*Primary Examiner* — Phuc T Dang
(74) *Attorney, Agent, or Firm* — WHDA, LLP

(57) ABSTRACT

An adhesive sheet according to the present invention is an adhesive sheet including a different material sheet configured to be flush with the rest of the adhesive sheet.

5 Claims, 2 Drawing Sheets

(52) U.S. Cl.
CPC .... *C09J 2203/326* (2013.01); *C09J 2301/124* (2020.08); *C09J 2301/50* (2020.08)

(58) Field of Classification Search
USPC ........................................................ 257/712
See application file for complete search history.

(56) References Cited

U.S. PATENT DOCUMENTS

| | | |
|---|---|---|
| 2008/0131641 A1 | 6/2008 | Hannington |
| 2011/0132530 A1 | 6/2011 | Hannington |
| 2011/0132531 A1 | 6/2011 | Hannington |
| 2011/0159296 A1 | 6/2011 | Maenaka et al. |
| 2020/0388551 A1 | 12/2020 | Ashiba et al. |

FOREIGN PATENT DOCUMENTS

| | | | |
|---|---|---|---|
| JP | 8-193188 A | | 7/1996 |
| JP | H10-163391 A | | 6/1998 |
| JP | 2006-117748 A | | 5/2006 |
| JP | 2008-88406 A | | 4/2008 |
| JP | 2011-116074 A | | 6/2011 |
| JP | 2013-30649 A | | 2/2013 |
| JP | 2014-70182 A | | 4/2014 |
| JP | 2014-220348 A | | 11/2014 |
| JP | 2015-82652 A | | 4/2015 |
| KR | 20080062285 A | * | 7/2008 |
| KR | 20120106623 A | * | 9/2012 |
| WO | 2006/026189 A2 | | 3/2006 |

OTHER PUBLICATIONS

International Search Report dated Sep. 14, 2021, issued in counterpart International Application No. PCT/JP2021/025063 (3 pages).
Office Action dated Jul. 5, 2024, issued in counterpart CN application No. 202180051761.8, with Partial English translation. (20 pages).
Office Action dated Aug. 30, 2024, issued in counterpart JP Application No. 2020-141744, with English translation. (6 pages).
Extended Supplementary European Search Report dated Aug. 5, 2024, issued in counterpart Application No. 21860973.3. (7 pages).
Office Action dated May 8, 2025, issued in counterpart CN Application No. 202180051761.8, with English translation. (14 pages).

* cited by examiner

ADHESIVE SHEET, SEMICONDUCTOR MODULE, AND METHOD FOR PRODUCING ADHESIVE SHEET

CROSS-REFERENCE TO RELATED APPLICATION

This application claims priority to Japanese Patent Application No. 2020-141744, the disclosures of which is incorporated herein by reference in its entirety.

FIELD

The present invention relates to an adhesive sheet, a semiconductor module, and a method for producing an adhesive sheet.

BACKGROUND

Conventionally, a semiconductor module having a resin-molded lead frame or the like with a semiconductor device mounted thereon has been widely used. For the semiconductor module, heat radiation measures are taken by, for example, forming a lead frame with a thick metal plate, allowing heat generated by a semiconductor device mounted on the metal plate to be conducted to the metal plate side, and further allowing the heat to be radiated to the outside of the module through a radiator. The radiator of the semiconductor module of this type is generally made of a metal such as aluminum or copper and is exposed to the outside. Thus, for the purpose of ensuring the safety, for example, an electrically insulating layer is formed between the semiconductor device and the radiator. With regard to such a semiconductor module, for example, Patent Literature 1 below describes a semiconductor module including a semiconductor device, a lead frame adhered to a lower surface of the semiconductor device, a radiator disposed on a lower side of the lead frame, and an electrically insulating layer formed between the radiator and the lead frame.

CITATION LIST

Patent Literature

Patent Literature 1: JP 2013-30649 A

SUMMARY

Technical Problem

The electrically insulating layer of the semiconductor module as aforementioned is formed by, for example, an adhesive sheet composed of an adhesive resin composition including an inorganic filler. For forming the electrically insulating layer, not only one adhesive sheet is used alone, but also two or more adhesive sheets are laminated for use. In this regard, in consideration of the possibility that, for example, a defect such as a void or a crack is present in an adhesive sheet, two or more adhesive sheets are laminated on each other to form an electrically insulating layer that is highly-reliable in terms of electrical insulation.

Meanwhile, in order to enable the adhesive sheet to exert another function in addition to the function exerted by the adhesive resin composition, it is conceivable to form a sheet body by the adhesive resin composition, while additionally incorporating a different material sheet formed by a material different from the adhesive resin composition. Then, when the different material sheet is made to have a smaller area than that of the sheet body and is layered on a surface of the sheet body, the adhesive sheet has opposite surfaces at least partly composed of the adhesive resin composition, to thereby exhibit the adhesiveness derived from the adhesive resin composition. Also, the exposure of the different material sheet on one adhesive surface of the adhesive sheet provides the adhesive surface with another function by the different material sheet in addition to the adhesiveness derived from the adhesive resin composition. Thus, the adhesive sheet can be utilized in various applications by various combinations of an adhesive resin composition and a different material sheet. However, when the different material sheet protrudes in a thickness direction of the adhesive sheet to thereby cause a step at an outer peripheral edge of the different material sheet, air is likely to be entrapped at a location with the step formed therein at the time of the adhesion of the adhesive sheet. Accordingly, there is a problem that providing the adhesive sheet with the different material sheet for exerting various functions is likely to cause the air entrapment at the time of the adhesion. Particularly in the semiconductor module, there is a problem that air entrapped at the time of formation of the electrically insulating layer causes the occurrence of a void.

In view of the above problems, the present invention has been achieved and thus has an object to provide an adhesive sheet that suppresses the air entrapment at the time of adhesion, while including a different material sheet, and to provide a semiconductor module that includes an electrically insulating layer having excellent insulation reliability.

Solution to Problem

In order to solve the above problems, the present invention provides an adhesive sheet including a first adhesive surface and a second adhesive surface on the opposite side to the first adhesive surface, each serving as an adhesive surface to be adhered to an adherend, the adhesive sheet including: a sheet body that is composed of an adhesive resin composition, and a different material sheet that is composed of a material other than the adhesive resin composition, has a thickness smaller than that of the sheet body, and has an area smaller than that of the sheet body, the different material sheet being embedded in the sheet body to be exposed on the first adhesive surface, the first adhesive surface having a first area part composed of the adhesive resin composition and a second area part composed of the material other than the adhesive resin composition, the second area part being flush with the first area part.

In order to solve the above problems, the present invention also provides a semiconductor module including: a semiconductor device; a metal plate that is disposed on a lower side of the semiconductor device and allows heat generated by the semiconductor device to be transferred therethrough; a radiator that is disposed on a lower side of the metal plate and allows the heat to be transferred from the metal plate; a resin mold that covers the semiconductor device and the metal plate; and an electrically insulating layer that is provided between the radiator and the metal plate, at least a part of the electrically insulating layer being formed by the adhesive sheet.

In order to solve the above problems, the present invention also provides a method for producing an adhesive sheet, the method including: producing a sheet body of a first state that has a double layer structure having one surface composed of a copper foil and the other surface composed of an adhesive resin composition; producing a sheet body of a second state by removing a part of the copper foil from the sheet body of the first state to have the one surface of the sheet body of the second state to have the one surface that includes a first area part on which the adhesive resin composition is exposed and a second area part on which the copper foil remains; and hot-pressing the sheet body of the second state to produce an adhesive sheet having the second area part being flush with the first area part.

DESCRIPTION OF EMBODIMENTS

Hereinafter, a preferable embodiment of the present invention will be described with reference to the drawings. First, a semiconductor module will be described.

Figure 1:
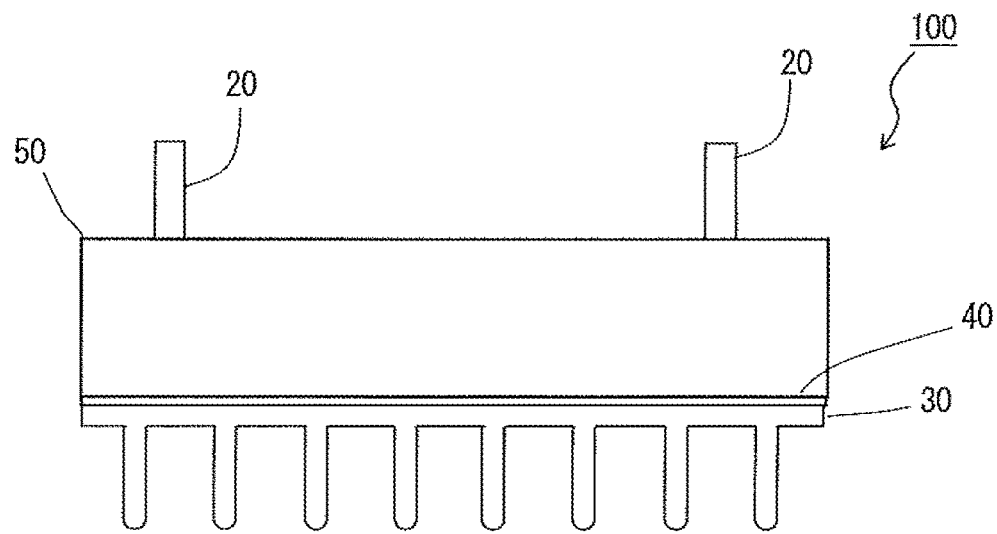
FIG. 1 is a schematic front view showing a structure of a semiconductor module.
Figure 2:
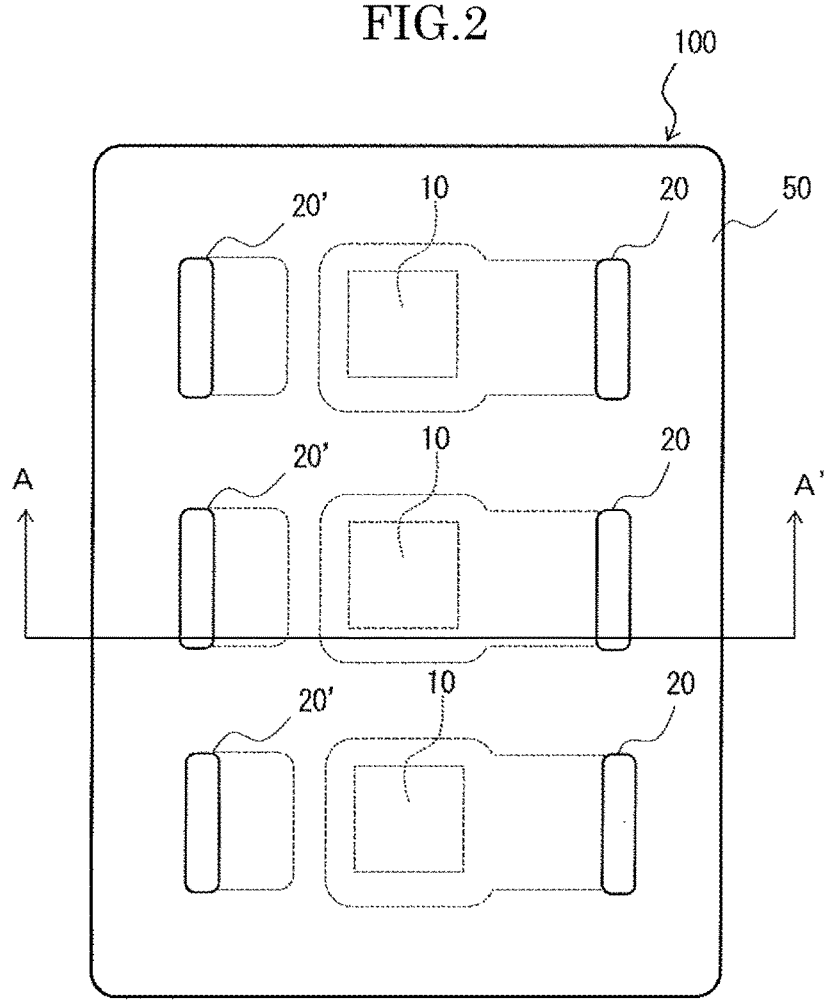
FIG. 2 is a schematic plan view showing a structure of the semiconductor module.
Figure 3:
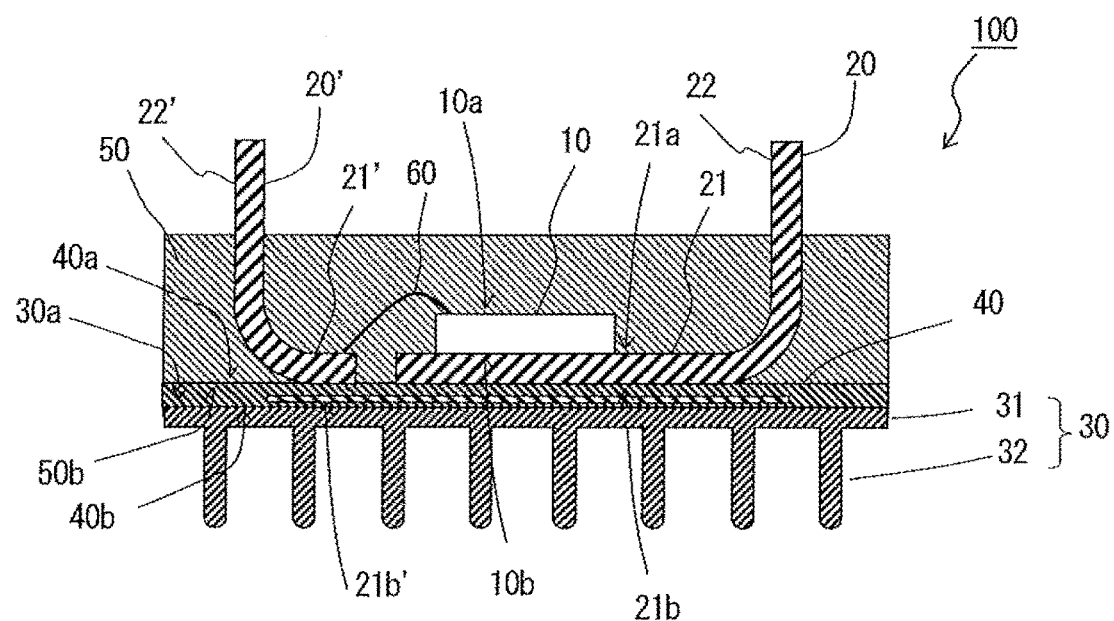
FIG. 3 is a schematic cross-sectional view showing a structure of the semiconductor module, specifically, a cross-sectional view when viewed in a direction of arrows A-A' in FIG. 2.

FIG. 1 is a schematic front view of a semiconductor module of this embodiment, and FIG. 2 is a schematic plan view of the semiconductor module. FIG. 3 is a schematic cross-sectional view of the semiconductor module of this embodiment when viewed in a direction of arrows A-A' in FIG. 2, showing an inner structure thereof.

As shown in the figures, the semiconductor module of this embodiment has a flat box shape. The semiconductor module according to this embodiment has a rectangular shape in plan view. The semiconductor module according to this embodiment has a longitudinally elongated rectangular shape in plan view. In the semiconductor module, six terminals protrude upward on a top surface side, and a plurality of fins protrude downward on a bottom surface side. Note that, hereinafter, the description for an embodiment of the present invention will be given by taking "vertical direction" of FIGS. 1 and 3 in front view as "up-down direction", and the "up-down direction" may be referred to as "perpendicular direction" or "thickness direction". Also, hereinafter, a direction orthogonal to the "perpendicular direction" may be referred to as "horizontal direction" or "plane direction". Among them, "lateral direction" in FIGS. 1 and 3 in front view may be referred to as "left-right direction". Further, hereinafter, the "vertical direction" in FIG. 2 in front view may be referred to as "longitudinal direction" of the semiconductor module, and the "lateral direction" in FIG. 2 in front view may be referred to as "width direction" of the semiconductor module.

A semiconductor module 100 of this embodiment has three semiconductor devices 10 located at a central portion in the thickness direction and at a central portion in the width direction. The semiconductor devices 10 are aligned at intervals in the longitudinal direction of the semiconductor module. The semiconductor module 100 of this embodiment is a metal plate that allows heat generated by the semiconductor device 10 to be transferred therethrough, and includes lead members 20 that function as conductive paths to the semiconductor device 10. Further, the semiconductor module 100 of this embodiment includes a radiator 30 on a lower side of the lead members 20 to allow the heat to be transferred from the lead members 20. The semiconductor module 100 includes an electrically insulating layer 40 that is formed by an adhesive sheet that is interposed between the radiator and the metal plate.

The lead members 20 in this embodiment are each a long plate-shaped metal member having a bent shape that is bent at a substantially right angle at a middle portion in the longitudinal direction. The lead members 20 in this embodiment each have a horizontal part 21 that is disposed in the semiconductor module with a plane surface extending in a substantially horizontal direction, and a perpendicular part 22 that extends perpendicularly upward from one end of the horizontal part 21, in which an upper end part of the perpendicular part 22 forms the terminal. In the semiconductor module 100 of this embodiment, the horizontal part 21 is disposed on the lower side of the semiconductor device 10, and an upper surface 21a of the horizontal part 21 is adhered to a lower surface 10b of the semiconductor device 10. In the semiconductor module 100 of this embodiment, each of the lead members 20 and the semiconductor device 10 are electrically connected to each other at the aforementioned adhesive point.

The semiconductor module 100 of this embodiment further include other lead members 20' separately from the lead members 20 each mounting the semiconductor device 10 on an upper surface of the horizontal part. Note that, hereinafter, the lead members 20 respectively mounting the semiconductor devices 10 thereon will be referred to as "first lead members" and the other lead members 20' will be referred to as "second lead members".

The second lead member 20' has a horizontal part 21' and a perpendicular part 22' in the same manner as the first lead member 20; the horizontal part 21' and the semiconductor device 10 are electrically connected to each other via a bonding wire 60; and an upper end part of the perpendicular part 22' forms another terminal separately from the terminal formed by the first lead member 20. Thus, the second lead member 20' is incorporated in the semiconductor module 100.

In the semiconductor module 100 of this embodiment, a lower surface 21b of the horizontal part 21 of the first lead member 20 and a lower surface 21b' of the horizontal part 21' of the second lead member 20' are adhered to an upper surface 40a of the electrically insulating layer 40, and a lower surface 40b of the electrically insulating layer 40 is adhered to an upper surface 30a of the radiator 30. The radiator 30 in this embodiment includes a plate-shaped base part 31 having an upper surface to which the lower surface 40b of the electrically insulating layer 40 is adhered, and a fin part 32 including a plurality of fins extending downward from the lower surface of the base part 31.

Also, in the semiconductor module 100 of this embodiment, a resin mold 50 is formed on an upper side of the upper surface 40a of the electrically insulating layer 40 to cover the semiconductor device 10, the first lead member 20, and the second lead member 20'. Accordingly, the upper surface 40a of the electrically insulating layer 40 is adhered to a lower surface 50b of the resin mold 50 through the areas other than the areas where the upper surface 40a is adhered to the first lead member 20 and the second lead member 20'.

Figure 4:
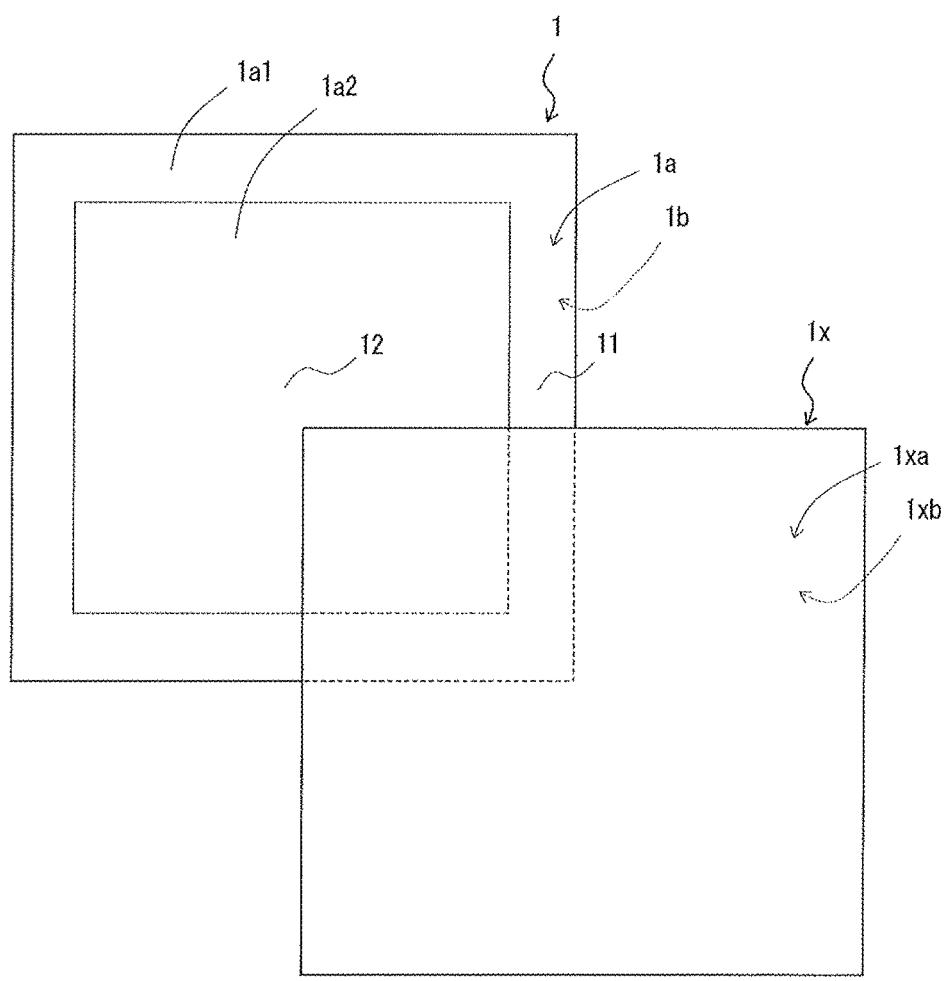
FIG. 4 is a schematic plan view showing a usage of an adhesive sheet.

Two adhesive sheets 1, 1x as shown in FIG. 4 (schematic plan view) are used for forming the electrically insulating layer 40. That is, the electrically insulating layer 40 is formed by laminating two adhesive sheets 1, 1x having the same shape in plan view with their edges aligned with each other and has a two layer structure. An adhesive sheet 1 (hereinafter, also referred to as "first adhesive sheet") that is one of the two adhesive sheets, and another adhesive sheet 1x (hereinafter, also referred to as "second adhesive sheet") each have both surfaces respectively being adhesive surfaces. In the electrically insulating layer 40, the first adhesive sheet 1 forms a lower layer, and the second adhesive sheet 1x forms an upper layer.

The first adhesive sheet 1 of this embodiment is interposed between the second adhesive sheet 1x and the radiator 30 (base part 31), and the second adhesive sheet 1x of this embodiment is interposed between the first adhesive sheet 1 and the lead members 20, 20'. The first adhesive sheet 1 has an upper surface as a first adhesive surface 1a to which the second adhesive sheet 1x as an adherend is adhered, and a lower surface on the opposite side to the first adhesive surface 1a as a second adhesive surface 1b to which the upper surface of the base part 31 of the radiator 30 is adhered. On the other hand, the second adhesive sheet 1x has an upper surface as a first adhesive surface 1xa to which the lead members 20, 20', and the like as adherends are adhered, and a lower surface on the opposite side to the first adhesive surface 1xa as a second adhesive surface 1xb to which the first adhesive surface 1a of the first adhesive sheet 1 is adhered.

The first adhesive sheet 1 has a sheet body 11 composed of an adhesive resin composition, and further has a different material sheet 12 composed of a material different from the adhesive resin composition, having a smaller thickness than the sheet body 11 and having a smaller area than the sheet body 11. In the first adhesive sheet 1, the different material sheet 12 is embedded in the sheet body 11 to be exposed on the first adhesive surface 1a, the first adhesive surface 1a having a first area part 1a1 composed of the adhesive resin composition and a second area part 1a2 composed of the material different from the adhesive resin composition. The second area part 1a2 of the first adhesive sheet 1 is flush with the first area part 1a1 without generating a step at a boundary between the first area part 11a and the second area part 1a2. While the first adhesive surface 1a of the first adhesive sheet 1 is composed of two materials respectively having different properties, the second adhesive surface 1b is composed solely of the adhesive resin composition that forms the sheet body 11.

The second adhesive sheet 1x of this embodiment is composed solely of the adhesive resin composition and does not include the different material sheet 12. Accordingly, the first adhesive surface 1xa and the second adhesive surface 1xb of the second adhesive sheet 1x are composed solely of the adhesive resin composition in the same manner as the second adhesive surface 1b of the first adhesive sheet 1. The second area part 1a2 of the first adhesive sheet 1 is located at a central part of the first adhesive surface 1a while being completely surrounded by the first area part 1a1. Therefore, the different material sheet 12 of this embodiment being embedded in the adhesive resin composition and the adhesive resin composition together form the electrically insulating layer 40. Thus, in the electrically insulating layer 40, a central portion relatively strongly reflects the property of the different material sheet 12 and an outer peripheral portion causes less influence on the property of the electrically insulating layer 40 so that the electrically insulating layer 40 exhibits the different properties.

Herein, the resin mold 50 can be generally formed by, for example, a cast molding method of a resin composition in a heated and molten state, in the same manner as a conventional semiconductor module. In this case, the outer peripheral portion of the electrically insulating layer 40 receives a force by which the outer peripheral portion is more strongly pulled in a thickness direction, the force being caused by the curing and shrinkage of the resin mold 50, than the central portion. The outer peripheral portion is likely to be more strongly affected than the central portion by, for example, a stress generated at an interface between the resin mold 50 and the electrically insulating layer 40 and a stress generated at an interface between the radiator 30 and the electrically insulating layer 40 due to, for example, the temperature difference of the semiconductor module 100 between the operation time and the standby time and the difference in the thermal expansion coefficient between the resin mold 50 and the radiator 30. Since the outer peripheral portion of the electrically insulating layer 40 in this embodiment is formed solely by the adhesive resin composition, the outer peripheral portion can exhibit a strong resistance force against the stresses as described above. Although the likelihood of causing an interfacial delamination may be higher in the central portion of the electrically insulating layer 40 due to the presence of the different material sheet 12 than in the outer peripheral portion, the different material sheet 12 makes it easy to allow the central portion of the electrically insulating layer 40 to exhibit various properties different from those of the outer peripheral portion. Furthermore, in the electrically insulating layer 40, no step is caused around the different material sheet 12 when the first adhesive sheet 1 and the second adhesive sheet 1x are layered on each other, so that the air entrapment can be suppressed and the formation of a void can be also suppressed.

The adhesive resin composition used for forming the electrically insulating layer 40 as described above preferably has excellent electrical insulation properties and preferably has a volume resistivity of $1\times10^{13}$ Ω·cm or more. The volume resistivity of the adhesive resin composition is generally $1\times100^{18}$ Ω·cm or less. The volume resistivity can be measured by, for example, a method according to JIS C2139 and obtained by performing the aforementioned measurement to a sheet produced using the adhesive resin composition.

It is preferable that the adhesive resin composition include a resin and an inorganic filler having higher thermal conductivity than that of the resin in order to allow the electrically insulating layer 40 to exhibit excellent thermal conductivity. The resin included in the adhesive resin composition in this embodiment is not specifically limited, and can be a thermoplastic resin or a thermosetting resin. Examples of the thermoplastic resin include polyethylene resin, polypropylene resin, ethylene-vinyl acetate copolymer resin, polyvinyl chloride resin, polystyrene resin, phenoxy resin, acrylic resin, polyamide resin, polyamide-imide resin, polyimide resin, polyether-amide-imide resin, polyether sulfide resin, polyphenylene sulfide resin, polyether-imide resin, and thermoplastic elastomer. Examples of the thermosetting resin to be employed include epoxy resin, phenol resin, and unsaturated polyester resin. Many of the thermoplastic resins among the resins listed above as examples hardly exert a high adhesive force when used alone. Therefore, when the thermoplastic resin is included in the adhesive resin composition, an adhesive additive agent such as a tackifier can be additionally included. Among the aforementioned resins, the epoxy resin is suitable because the epoxy resin exhibits high adhesiveness without including a tackifier or the like and also has high receptivity for the inorganic filler. That is, it is preferable that the adhesive resin composition in this embodiment be an epoxy resin composition.

Examples of the epoxy resin include: bisphenol type epoxy resin such as bisphenol A type epoxy resin and bisphenol F type epoxy resin; and novolak type epoxy resin such as phenol novolak type epoxy resin and cresol novolak type epoxy resin. The epoxy resin can be a modified product subjected to CTBN modification. The epoxy resin can be of a high-molecular-weight type which is so called as, for example, a phenoxy resin. The aforementioned epoxy resins can be individually included in the adhesive resin composition, or two or more of them can be included.

A curing agent or a curing accelerator for curing the epoxy resin can be additionally included in the adhesive resin composition. The curing agent is not specifically limited, but it is possible to use: amine curing agent such as diaminodiphenylsulfone, dicyandiamide, diaminodiphenylmethane, and triethylenetetramine; phenolic curing agent such as phenol novolac resin, aralkyl phenolic resin, dicyclopentadiene modified phenolic resin, naphthalene phenolic resin, and bisphenol phenolic resin; and acid anhydride. The curing accelerator is not specifically limited, but amine curing accelerators such as imidazoles, triphenyl phosphate (TPP), and boron trifluoride monoethylamine can be used. Also for each of the curing agent and the curing accelerator, those exemplified above can be individually included in the adhesive resin composition, or two or more of at least one of the curing agent and the curing accelerator can be included in the adhesive resin composition.

As the inorganic filler to be included in the adhesive resin composition, inorganic fillers widely and generally adopted to cause a resin product to exhibit thermal conductivity can be adopted, but boron nitride is suitable because of its excellent thermal conductivity. Furthermore, it is preferable to use particles (aggregated particles) which are plate-shaped primary particles of nitride boron gathered and aggregated. Examples of the aggregated particles that can be used include aggregated particles (granular particles) formed into the state where the particles are entirely granular, and aggregated particles (collected particles) formed into the state where the primary particles of boron nitride are collected to the extent that their scale-like structure can be distinguished.

In order to cause the electrically insulating layer 40 to exhibit excellent thermal conductivity, it is preferable that the adhesive resin composition include the aforementioned epoxy resin and inorganic filler and have a content of the inorganic filler being 50 volume % or more. The content of the inorganic filler is more preferably 55 volume % or more, particularly preferably 60 volume % or more. In order to cause the adhesive resin composition to exhibit excellent adhesiveness, the content of the inorganic filler in the adhesive resin composition is preferably 75 volume % or less, more preferably 70 volume % or less.

The proportion of the epoxy resin in all the resins in the adhesive resin composition is preferably 90 mass % or more, more preferably 95 mass % or more, and particularly preferably includes substantially no resin other than the epoxy resin.

Other than the aforementioned components, components that are generally used as rubber, plastic formulations such as a dispersant, an anti-aging agent, an antioxidant, a processing aid, a stabilizer, a defoamer, a flame retardant, a thickener, and a pigment can be appropriately included in the adhesive resin composition.

In this embodiment, the different material sheet, which together with the adhesive resin composition, forms the electrically insulating layer 40 forms the electrically insulating layer 40 while being embedded in the adhesive resin composition. Thus, the different material sheet does not necessarily have an electrical insulation properties, and can have an electrical conductivity.

Examples of the different material sheet include a resin film, a rubber sheet, and a metal film. Examples of the different material sheet also include a fiber sheet composed of various fibers such as resin fibers, carbon fibers, glass fibers, ceramic fibers, and metal fibers. The different material sheet does not need to have flexibility, and can be a ceramic plate, a glass plate, or a metal plate. Effects exerted by the different material sheet on the adhesive sheet or the electrically insulating layer include effects of the mechanical characteristics such as bending tensile strength or flexibility, effects of the thermal characteristics such as thermal decomposition characteristics or flame retardancy, and effects of the electromagnetic characteristics such as dielectric performance or shielding performance.

The electrically insulating layer 40 generally has a thickness of 10 µm or more and 1000 µm or less. The electrically insulating layer 40 preferably has a thickness of 50 µm or more and 500 µm or less. The first adhesive sheet 1 and the second adhesive sheet 1x each generally have a thickness of 5 µm or more and 500 µm or less, and preferably have a thickness of 25 µm or more and 250 µm or less. The first adhesive sheet 1 and the second adhesive sheet 1x can have the same thickness or different thicknesses. The different material sheet included in the first adhesive sheet 1 can have a thickness of, for example, 1 µm or more and 200 µm or less. The thickness of the different material sheet is preferably 1/100 or more and 1/2 or less, more preferably 1/10 or more and 1/3 or less of the thickness of the first adhesive sheet 1. The size (area) of the different material sheet can be, for example, 10% or more and 80% or less of the area of the first adhesive sheet 1.

In order to allow the adhesive resin composition to exhibit excellent adhesiveness, the different material sheet is preferably an electrolytic copper foil. It is observed that the electrolytic copper foil is flat on one side in contact with an electrolytic drum, and is uneven of several micrometer scale on the other side in contact with an electrolyte, during the production. The flat surface of the electrolytic copper foil is referred to as, for example, a glossy surface or a shining surface, and the uneven surface is referred to as, for example, a matte surface. The second area part 1a2 of the first adhesive sheet 1 is preferably formed by the shining surface because air is hardly is entrapped between the second adhesive sheet 1x and the first adhesive sheet 1. That is, in the first adhesive sheet 1 in this embodiment, it is preferable that the different material sheet be the electrolytic copper foil having a matte surface and a shining surface, and the second area part 1a2 be formed by the shining surface of the electrolytic copper foil.

In the case where a copper foil is adopted as the different material sheet, it is preferable to adopt a method including the following steps as a method for producing the first adhesive sheet 1.

a) Step of dispersing an adhesive resin composition into an organic solvent to prepare a coating liquid;

b) Step of coating one side of a copper foil with the coating liquid on and drying the one side to produce a sheet body of a first state, which has a double layer structure with one surface composed of a copper foil and the other surface composed of the adhesive resin composition;

c) Step of removing a part of the copper foil from the sheet body of the first state to produce a sheet body of a second state, which has the one surface having a first area part on which the adhesive resin composition is exposed, and a second area part on which the copper foil remains; and d) Step of hot-pressing the sheet body of the second state to produce an adhesive sheet having the second area part being flush with the first area part.

The above "a) step" can be performed by using a device such as a homogenizer or a mixer. The above "b) step" can be performed by using a device such as a gravure coater or a kiss coater, and a heating and drying oven, or the like. The above "c) step" can be performed by using, for example, an etching machine. The above "d) step" can be performed by using a device, for example, a vacuum hot press. In the case where an epoxy resin composition is used as the adhesive resin composition, the curing degree of the epoxy resin composition is preferably adjusted by adjusting the amount of heat to be applied thereto in the "d) step". In the production method as described above, it is possible to provide the effect of producing an adhesive sheet as desired in a simple and easy way. Furthermore, according to the adhesive sheet obtained by the above production method, a step around the copper foil on the side with the copper foil being exposed thereon disappears in the "d) step". Thus it is possible to prevent, at the time of adhesion, the entrapment of air bubbles due to the presence of the step.

In the above examples, the description for an embodiment of the present invention was made by taking, for example, the case where an adhesive sheet including a different material sheet and an adhesive sheet including no different material sheet are layered with each other to form an electrically insulating layer of a semiconductor module, but the use form of the adhesive sheet of the present invention is not limited to the above exemplified case. For example, the electrically insulating layer can be formed by one adhesive sheet including a different material sheet, or can be formed by layering a plurality of adhesive sheets each including a different material sheet. The adhesive sheet of the present invention is used not only for forming the electrically insulating layer of the semiconductor module, and is not specifically limited in the application. Further, the present invention is not limited to the aforementioned exemplification.

The matters disclosed herein include the following:

(1)

An adhesive sheet including a first adhesive surface and a second adhesive surface on the opposite side to the first adhesive surface, each serving as an adhesive surface to be adhered to an adherend, the adhesive sheet including: a sheet body that is composed of an adhesive resin composition, and a different material sheet that is composed of a material other than the adhesive resin composition, has a thickness smaller than that of the sheet body, and has an area smaller than that of the sheet body, the different material sheet being embedded in the sheet body to be exposed on the first adhesive surface, the first adhesive surface having a first area part composed of the adhesive resin composition and a second area part composed of the material other than the adhesive resin composition, the second area part being flush with the first area part.

In the adhesive sheet according to this embodiment, the first area part composed of the adhesive resin composition and the second area part composed of the material other than the adhesive resin composition are flush with each other in the first adhesive surface of the adhesive sheet. In other words, the different material sheet composed of the material other than the adhesive resin composition is embedded in the first adhesive surface of the adhesive sheet to be flush with the first area part composed of the adhesive resin composition. Thereby, the air entrapment caused by a step can be suppressed at the time of the use of the adhesive sheet. That is, air is unlikely to be entrapped in the adhesive sheet according to this embodiment at the time of adhesion.

(2)

The adhesive sheet according to the above (1), in which the adhesive resin composition includes an epoxy resin and an inorganic filler, and a content of the inorganic filler is 50 volume % or more.

According to this configuration, the adhesive sheet can exhibit excellent thermal conductivity.

(3)

The adhesive sheet according to the above (2), in which a content of the inorganic filler is 75 volume % or less.

According to this configuration, it is possible to enable the adhesive resin composition to exhibit excellent adhesiveness.

(4)

The adhesive sheet according to any one of the above (1) to (3), in which the different material sheet is an electrolytic copper foil having a matte surface and a shining surface, and the second area part is formed by the shining surface of the electrolytic copper foil.

According to this configuration, the different material sheet can easily exhibit excellent adhesiveness for the adhesive resin composition since the different material sheet is formed by the electrolytic copper foil. Further, the second area part formed by the shining surface of the electrolytic copper foil can suppress air from being entrapped between an adherend and the second area part when the adhesive sheet is used. That is, the air entrapment caused by a step can be suppressed at the time of the use of the adhesive sheet.

(5)

A semiconductor module including: a semiconductor device; a metal plate that is disposed on a lower side of the semiconductor device and allows heat generated by the semiconductor device to be transferred therethrough; a radiator that is disposed on a lower side of the metal plate and allows the heat to be transferred from the metal plate; and a resin mold that covers the semiconductor device and the metal plate, and an electrically insulating layer that is provided between the radiator and the metal plate, at least a part of the electrically insulating layer being formed by the adhesive sheet according to any one of the above (1) to (4).

According to this configuration, air is hardly entrapped in the semiconductor module when the radiator and the metal plate are adhered to each other since at least a part of the electrically insulating layer is formed by the adhesive sheet as described above. Thereby, the semiconductor module according to this embodiment can have an electrically insulating layer having excellent insulation reliability.

(6)

A method for producing an adhesive sheet, the method including: producing a sheet body of a first state that has a double layer structure having one surface composed of a copper foil and the other surface composed of an adhesive resin composition; producing a sheet body of a second state by removing a part of the copper foil from the sheet body of the first state to have the one surface of the sheet body of the second state to have the one surface that includes a first area part on which the adhesive resin composition is exposed and a second area part on which the copper foil remains; and hot-pressing the sheet body of the second state to produce an adhesive sheet having the second area part being flush with the first area part.

According to this configuration, it is possible to easily produce an adhesive sheet having a first area part on which the adhesive resin composition is exposed and a second area part on which the copper foil remains. Further, the adhesive sheet obtained by the above production method can suppress the air entrapment at the time of adhesion.

The adhesive sheet, the semiconductor module, and the method for producing an adhesive sheet according to the present invention are not limited to the aforementioned embodiments. Further, the adhesive sheet, the semiconductor module, and the method for producing an adhesive sheet according to the present invention are not limited by the aforementioned functions and effects. Various modifications can be made to the adhesive sheet, the semiconductor module, and the method for producing an adhesive sheet according to the present invention without departing from the gist of the present invention.

REFERENCE SIGNS LIST

1: Adhesive sheet
1a: First adhesive surface
1a1: First area part
1a2: Second area part
10: Semiconductor device
11: Sheet body
12: Different material sheet
20: Lead member (metal plate)
30: Radiator
40: Electrically insulating layer
50: Resin mold

The invention claimed is:

1. An adhesive sheet comprising a first adhesive surface and a second adhesive surface on the opposite side to the first adhesive surface, each serving as an adhesive surface to be adhered to an adherend, the adhesive sheet comprising:
a sheet body that is composed of an adhesive resin composition, and
a different material sheet that is composed of a material other than the adhesive resin composition, has a thickness smaller than that of the sheet body, and has an area smaller than that of the sheet body,
the different material sheet being embedded in the sheet body to be exposed on the first adhesive surface,
the first adhesive surface having a first area part composed of the adhesive resin composition and a second area part composed of the material other than the adhesive resin composition,
the second area part being flush with the first area part,
the different material sheet being an electrolytic copper foil having a matte surface and a shining surface,
the second area part being formed by the shining surface of the electrolytic copper foil.

2. The adhesive sheet according to claim 1, wherein
the adhesive resin composition comprises an epoxy resin and an inorganic filler, and
a content of the inorganic filler is 50 volume % or more.

3. A semiconductor module comprising:
a semiconductor device;
a metal plate that is disposed on a lower side of the semiconductor device and allows heat generated by the semiconductor device to be transferred therethrough;
a radiator that is disposed on a lower side of the metal plate and allows the heat to be transferred from the metal plate;
a resin mold that covers the semiconductor device and the metal plate; and
an electrically insulating layer that is provided between the radiator and the metal plate,
at least a part of the electrically insulating layer being formed by the adhesive sheet according to claim 1.

4. A method for producing an adhesive sheet, the method comprising:
producing a sheet body of a first state that has a double layer structure having one surface composed of a copper foil and the other surface composed of an adhesive resin composition;
producing a sheet body of a second state by removing a part of the copper foil from the sheet body of the first state to have the one surface of the sheet body of the second state to have the one surface that includes a first area part on which the adhesive resin composition is exposed and a second area part on which the copper foil remains; and
hot-pressing the sheet body of the second state to produce an adhesive sheet having the second area part being flush with the first area part.

5. The method for producing the adhesive sheet according to claim 4, wherein
the adhesive resin composition comprises an epoxy resin and an inorganic filler, and
a content of the inorganic filler of the adhesive resin composition is 50 volume % or more after the adhesive sheet is produced.

* * * * *